United States Patent [19]

Kohno et al.

[11] Patent Number: 5,205,881

[45] Date of Patent: Apr. 27, 1993

[54] PNEUMATIC TIRE FOR PASSENGER CAR INCLUDING WAVE-SHAPED BELT REINFORCING ELEMENTS

[75] Inventors: Yoshihide Kohno; Hiroyuki Koseki, both of Kodaira, Japan

[73] Assignee: Bridgestone Corporation, Tokyo, Japan

[21] Appl. No.: 409,172

[22] Filed: Sep. 19, 1989

[30] Foreign Application Priority Data

Sep. 19, 1988 [JP] Japan ................. 63-232251

[51] Int. Cl.$^5$ ............... B60C 9/00; B60C 9/18
[52] U.S. Cl. .................. 152/527; 152/531; 152/534
[58] Field of Search ........... 152/526, 530, 531, 532, 152/533, 534, 536, 538, 527; 428/295, 369

[56] References Cited

U.S. PATENT DOCUMENTS

| | | | |
|---|---|---|---|
| 1,189,223 | 7/1916 | Albrecht | 152/533 |
| 1,800,179 | 4/1931 | Darrow | 152/527 X |
| 2,982,327 | 5/1961 | Vanzo et al. | 152/533 |
| 2,982,328 | 5/1961 | Emanueli et al. | |
| 2,987,095 | 6/1961 | Toulmin, Jr. | 152/536 |
| 3,044,522 | 7/1952 | Drakeford et al. | 152/533 |
| 3,126,042 | 3/1964 | Cegnar | 152/533 |
| 3,386,487 | 6/1968 | Massoubre | 152/526 |
| 3,467,161 | 9/1969 | Menell et al. | 152/526 |
| 3,500,890 | 3/1970 | Boileau | 152/526 X |
| 3,842,884 | 10/1974 | Bertrand | 152/538 |
| 3,863,696 | 2/1975 | Sperberg | 152/526 |
| 4,216,813 | 8/1980 | Kersker et al. | |
| 4,402,356 | 9/1983 | Musy | 152/527 X |
| 4,696,335 | 9/1987 | Tsukagoshi et al. | 152/526 X |
| 4,716,950 | 1/1988 | Morikawa et al. | 152/560 |
| 4,934,428 | 6/1990 | Aoki et al. | 152/532 |
| 5,009,732 | 4/1991 | Ikeda et al. | 156/177 |
| 5,054,532 | 10/1991 | Kohno et al. | 152/527 |

FOREIGN PATENT DOCUMENTS

| | | |
|---|---|---|
| 2501126 | 9/1982 | France ............ 152/527 |
| 64-6187 | 10/1989 | Japan . |
| 39277 | 10/1960 | Luxembourg . |
| 0815055 | 6/1959 | United Kingdom . |
| 2092963 | 8/1982 | United Kingdom . |

OTHER PUBLICATIONS

*Mechanics of Pneumatic Tires*, ed. Samuel Clark: US Dept. of Transportation, Aug. 1981, p. 155.

Primary Examiner—Michael W. Ball
Assistant Examiner—Adrienne C. Johnstone
Attorney, Agent, or Firm—Sughrue, Mion, Zinn, Macpeak & Seas

[57] ABSTRACT

A pneumatic tire for a passenger car includes a toroidal carcass anchored by a pair of beads and a belt made of laminated strips. The strips have a number of reinforcing elements of cords or filaments surrounding a crown of the toroidal carcass and are coated with a high molecular weight material having a modulus of elasticity less than that of the reinforcing elements. The belt is of a laminated construction of a first layer and a second layer of a single strip. The first layer has wave-shaped reinforcing elements arranged side by side and directing in parallel with an equatorial plane of the tire, while the second layer has reinforcing elements arranged in parallel with each other at angles of 15°–75°, preferably 35°–60° with respect to the equatorial plane.

9 Claims, 3 Drawing Sheets

FIG._1a
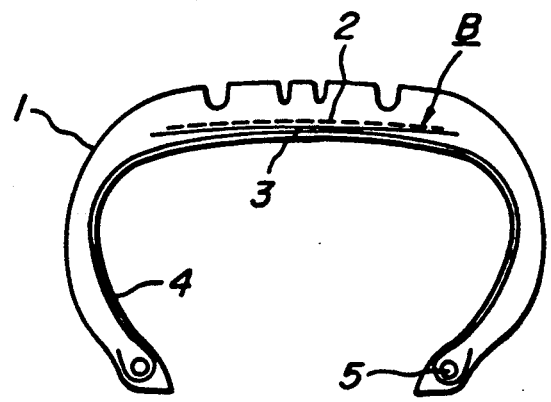
FIG._1b
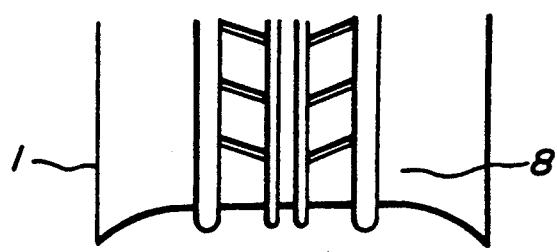
FIG._1c
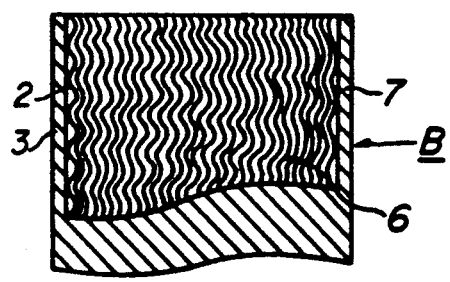

PNEUMATIC TIRE FOR PASSENGER CAR INCLUDING WAVE-SHAPED BELT REINFORCING ELEMENTS

BACKGROUND OF THE INVENTION

This invention relates to a pneumatic tire, and more particularly to a pneumatic tire whose belt construction is improved for general purpose, particularly for passenger cars.

In belt constructions of conventional tires of this kind, at least two belt layers as reinforcing elements, so-called "intersecting strips" are used whose cords intersect at acute angles within 15°-25° with respect to an equatorial plane of a tire.

Such a construction is intended to maintain a toroidal configuration of a radial carcass and to ensure a hoop effect for obtaining relatively flat tread surfaces and a shearing rigidity for suitably resisting to traverse forces occurring when the tire is cornering.

With such a belt construction, however, great tensile forces would occur along circumferences of the tire to expand diameters of the belt by actions of inner pressure filled in the tire, a load acting upon the tire and centrifugal forces particularly at high speeds.

In the above belt construction, as the cords of adjacent strips intersect with each other at acute angles of 15°-25° with respect to the equatorial plane, great shearing strains would occur between the strips at belt ends in radial sections due to the expansion of belt diameters. In an extreme case, the shearing strains may result in failure of the tire.

In order to avoid the disadvantage, it has been proposed to arrange additional reinforcing layers whose organic fiber cords or steel cords are arranged in parallel with each other along circumferences to cover belt ends of the intersecting strips in order to mitigate the expansion of the belt diameters due to tension. Such additional reinforcing layers are referred to as caps or layers.

In case of the additional reinforcing layers such as caps or layers, textile cords are mainly used for small type pneumatic tires for passenger cars so that maneuverability and durability to certain extent are accomplished. However, manufacturing cost is unavoidably increased due to an increase of members owing to the additional reinforcing layers, and the obtained durability is not necessarily sufficient.

SUMMARY OF THE INVENTION

It is an object of the invention to provide an improved pneumatic tire for a passenger car, which includes a belt construction improved to advantageously fulfill requirements with respect to desired belt performances without requiring any additional reinforcing layers.

The invention resides in the discovery that the above object is accomplished by two kinds of reinforcements separately having two performances required for the belt construction of the pneumatic tire for passenger cards, that is to say, the circumferential rigidity for maintaining a toroidal shape of a carcass and a shearing rigidity resisting to traverse forces. Such a discovery is quite different from the conventional concept requiring additional reinforcing layers.

In order to accomplish the object of the invention, in a pneumatic tire for a passenger car including a toroidal carcass anchored by at least a pair of bead cores, and a belt made of strips having a number of reinforcing elements of either of cords or filaments surrounding a crown of the toroidal carcass, said strips being coated with a high molecular weight material less in modulus of elasticity than the reinforcing elements, according to the invention said belt is of a laminated construction of a first layer and a second layer of a single strip, said first layer having wave-shaped reinforcing elements arranged side by side and directing in parallel with an equatorial plane of the tire, and said second layer having reinforcing elements arranged in parallel with each other at angles of 15°-75° with respect to the equatorial plane.

In a preferred embodiment of the invention, the first layer is a lamination of at least two strips. In another two embodiments, the first and second layers are laminated so that the first layers are positioned radially inwardly or outwardly of the second layers. In a further embodiment, the reinforcing elements of the second layers are inclined at angles of 35°-60° with respect to the equatorial plane. The reinforcing elements of the first layers are preferably made of steel wires.

In order that the invention may be more clearly understood, preferred embodiments will be described, by way of example, with reference to the accompanying drawings.

BRIEF DESCRIPTION OF THE DRAWINGS

FIGS. 1a, 1b and 1c are a sectional, a plan and a development view illustrating one embodiment of the tire according to the invention;

DESCRIPTION OF THE PREFERRED EMBODIMENTS

Figure 2A:
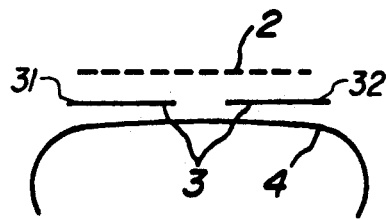
FIGS. 2a-2d are schematic views illustrating modifications of the belt construction according to the invention.

FIGS. 1a, 1b and 1c illustrate an embodiment of the tire according to the invention. The tire 1 includes a first layer 2, a second layer 3, a toroidal carcass 4 and bead cores 5.

The first and second layers 2 and 3 are of laminated constructions as shown in FIGS. 1a and 1c and serve as a belt B which aids the toroidal carcass 4 in reinforcing a crown of the tire.

Reference numeral 6 in this embodiment denotes reinforcing elements made of cords or filaments arranged side by side in wave forms (or zigzag) in the first layer 2 made of one strip and directing in parallel with an equatorial plane of the tire 1. Reference numeral 7 denotes reinforcing elements made of cords or filaments arranged in parallel with each other at angles of 15°-75° with respect to the equatorial plane of the tire 1. The tread rubber is illustrated by numeral 8 in FIG. 1b.

It has been found that another embodiment of the laminated construction of the belt B can also bring about the aimed effects of the invention.

The first layer 2 made of the reinforcing elements of wave (or zigzag) forms serves as circumferential rigidity means according to the invention.

In more detail, the first layer according to the invention does not have cord ends at strip ends in radial sections of the tire 1 as in conventional tires having belts intersecting at small acute angles. Therefore, even if the belt B is subjected to circumferential tensile forces, no shearing strains occur thereat and no separations are caused any longer.

Moreover, as the reinforcing elements are of wave (zigzag) forms, they scarcely obstruct expansion of diameters of the belt in producing the tire. Accordingly, conventional tire forming and vulcanizing techniques are applicable to the tire according to the invention without any trouble.

On the other hand, the second layer 3 serves as axial shearing rigid means for resisting to shearing forces in axial directions of the tire. Therefore, the second layer 3 is not needed to have large circumferential rigidity.

Figure 3A:
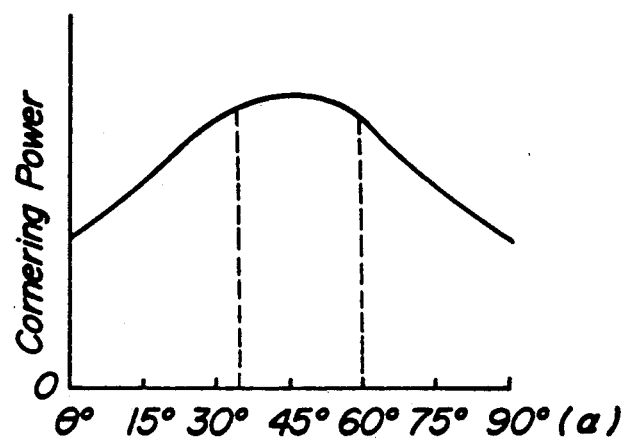
FIG. 3a is a graph for explaining a relation between the cornering power and cord angles.
Figure 3B:
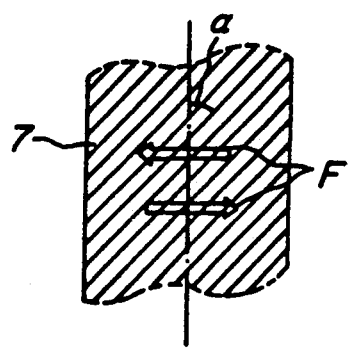
FIG. 3b is a view for explaining shearing forces in a tire.

The shearing rigidity explained herein is the rigidity against shearing forces F as shown in FIG. 3b. In an experiment in connection with the shearing rigidity, cornering power was obtained with change in cord inclined angles of the second layers of tires having the size 175/70 SR 13. The results are shown in FIG. 3a. As can be seen from the results, the addition of the second layers increases the shearing rigidity and provides high cornering powers at the cord inclined at angles of 35°–60°.

In case that cords of the second layer 3 are arranged at angles of 15°–20° with respect to circumferential directions of the tire, the second layer serves to increase the circumferential rigidity along the circumference of the tire. In other words, the cornering power is of a so-called "Gough rigidity" in the following relation.

$$1/CP = A/G + B/EI$$

where CP is cornering power, G is shearing rigidity in belt layers, EI is bending rigidity and A and B are constants.

From this relation, it should be understood that even if only the shearing rigidity is increased, the cornering power often does not become large depending upon material characteristics. In this case, it is preferable to make large the value of EI or increase the circumferential rigidity of the second layer. In such case, moreover, it is preferable to make large amplitudes of the wave forms so as to reduce the circumferential rigidity to raise the shearing rigidity.

Figure 2B:
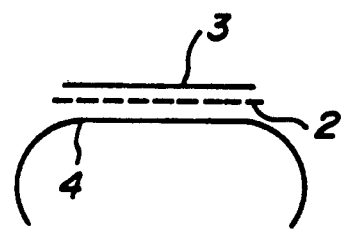
Figure 2C:
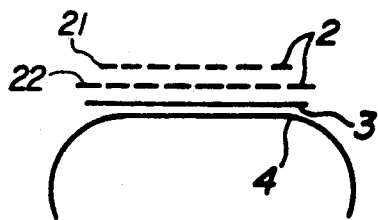
Figure 2D:
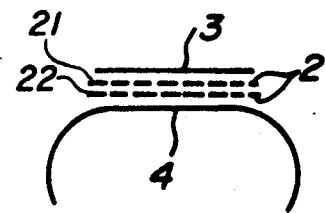

In the case of small type radial tires for passenger cars, it is preferable in view of manufacturing cost and rolling resistance to use the second layer 3 of a single strip for usual application of tires as shown in FIGS. 1 and 2a and 2b. In FIG. 2a the second layer 3 is split into two segments 31 and 32. In FIG. 2b the layers 2 and 3 are reversed with respect to FIG. 1. FIG. 2b layer 2 is wider than the axial outer layer 3. The second layer 3 has a sufficient shearing rigidity even in case of a single layer. FIGS. 2c and 2d illustrate other embodiments with two strips 21 and 22 comprising the layer 2. In FIG. 2c strips 21 and 22 have different widths while in FIG. 2d they are the same. The position of the strips 21 and 22 is reversed in FIG. 2d relative to FIG. 2c.

EXAMPLE

Tires of 175/70 SR 13 were produced by way of trial and tested on the cornering power and durability. The cornering power was tested with 1.9 kg/cm² inner pressure and the normal load. In durability test, a tire was urged with a load of twice the normal load against a drum of a drum testing machine and the drum was driven to rotate or roll the tire on the drum at a circumferential speed of 80 km/h. The durability of the tire was determined by rolling distances until any fault occurs in the tire. The comparative results are shown in the following Table.

TABLE

|  | Cornering power | Durability | Cost |
| --- | --- | --- | --- |
| Embodiment 1 | 98 | 189 | 92 |
| Embodiment 2 | 103 | 192 | 100 |
| Embodiment 3 | 102 | 165 | 101 |
| Comparative example 1 | 100 | 100 | 100 |
| Comparative example 2 | 112 | 115 | 110 |
| Comparative example 3 | 58 | 198 | 88 |

Belt constructions of the tested tires are as follows. Reinforcing constructions other than the belts are common to all the tires.

EMBODIMENT 1

The tires of the Embodiment 1 are according to FIGS. 1a–1c. Each of first and second layers 2 and 3 laminated is made of a single strip. Wave-shaped reinforcing elements 6 are made of steel wires (each 1×1, 0.5 mm$\phi$ diameter, 15.0 mm wave length, and 1.0 mm wave amplitude). On the other hand, reinforcing elements 7 of the second layers 3 are made of steel cords (each 1×2 and 0.3 mm$\phi$) arranged inclined at angles of 30° with respect to the equatorial plane.

EMBODIMENT 2

The tires of the Embodiment 2 are according to FIG. 2c. A first layer 2 is made of two strips. Wave-shaped reinforcing elements 6 are made of steel filaments (each 1×1, 0.3 mm$\phi$ diameter, 15.0 mm wave length and 1.0 mm wave amplitude). Cords of reinforcing elements 7 of a second layer 3 are inclined at 45°. Constructions other than the above are same as those in the Embodiment 1.

EMBODIMENT 3

The tires of the Embodiment 3 are according to FIG. 2d. A first layer 2 is made of two strips. Wave-shaped reinforcing elements 6 are made of steel filaments (each 1×1, 0.3 mm$\phi$ diameter, 15.0 mm wave length and 1.5 mm wave amplitude). Cords of reinforcing elements 7 of a second layer 3 are inclined at 15°. Constructions other than the above are same as those in the Embodiment 1.

COMPARATIVE EXAMPLE 1

Two intersecting strips are provided whose steel cords (each 1×3 and 0.2 mm$\phi$ diameter) intersect with each other at an equatorial plane at inclined angles of 20° with respect to the equatorial plane.

COMPARATIVE EXAMPLE 2

Two intersecting strips are provided whose steel cords (each 1×2 and 0.2 mm$\phi$ diameter) intersect with each other at and equatorial plane at inclined angles of 25° relative to the equatorial plane. In addition thereto, a cap is provided whose steel cords (each 1×1 and 0.5 mm$\phi$ diameter) are arranged at angles of 0° with respect to an equatorial plane.

COMPARATIVE EXAMPLE 3

The tires of the Comparative Example 3 have a construction similar to that of those of Embodiment 2 but do not have the caps.

As can be seen from the above description, the tire according to the invention has enough durability and maneuverability without using any additional reinforcements which have been essential members for fulfilling requirements with respect to performance of belts of pneumatic tires for passenger cars.

It is further understood by those skilled in the art that the foregoing description is that of preferred embodiments of the disclosed tires and that various changes and modifications may be made in the invention without departing from the spirit and scope thereof.

What is claimed is:

1. A pneumatic tire for a passenger car comprising; a toroidal carcass anchored by at least a pair of bead cores, and a belt made of layers having a number of reinforcing elements of either cords or filaments surrounding a crown of the toroidal carcass, said layers being coated with a high molecular weight material lower in modulus of elasticity than the reinforcing elements, said belt consisting of a laminated construction of at least one wavy cord first layer and a single parallel cord second layer, said first layer having wave-shaped metallic reinforcing elements arranged side by side and directed in parallel with an equatorial plane of the tire and located in the same plane, and said second layer is a single strip having reinforcing elements arranged in parallel with each other at angles of 15°–75° with respect to the equatorial plane.

2. A pneumatic tire as set forth in claim 1, wherein said first layer is a lamination of at least two strips.

3. A pneumatic tire as set forth in claim 1, wherein said first and second layers are laminated so that the first layer is positioned radially inwardly of the second layer.

4. A pneumatic tire as set forth in claim 1, wherein said first and second layers are laminated so that the first layer is positioned radially outwardly of the second layer.

5. A pneumatic tire as set forth in claim 1, wherein the reinforcing elements of the second layer are inclined at angles of 35°–60° with respect to the equatorial plane.

6. A pneumatic tire as set forth in claim 1, wherein the reinforcing elements of the first layer are made of steel wires.

7. A pneumatic tire as set forth in claim 3 wherein said first layer comprises a pair of strips.

8. A pneumatic tire as set forth in claim 4 wherein said first layer comprises a pair of strips.

9. A pneumatic tire as set forth in claim 4 wherein said second layer comprises axially split layer segments.

* * * * *